United States Patent [19]

Gentzhorn

[11] Patent Number: 4,923,242
[45] Date of Patent: May 8, 1990

[54] VEHICLE CAP AND BOAT COMBINATION

[76] Inventor: Michael D. Gentzhorn, 725 McDonald St., Elkhart, Ind. 46516

[21] Appl. No.: 178,572

[22] Filed: Apr. 7, 1988

[51] Int. Cl.$^5$ .................................................. B60P 3/32
[52] U.S. Cl. .................................... 296/157; 114/343; 414/462
[58] Field of Search ............... 296/157, 164; 280/414; 114/343, 344; 414/462

[56] References Cited

U.S. PATENT DOCUMENTS

| | | | |
|---|---|---|---|
| 1,455,994 | 5/1923 | Cowan | 296/157 |
| 2,310,431 | 2/1943 | Hart | 296/157 |
| 2,598,458 | 5/1952 | Somers | 296/157 |
| 2,817,852 | 12/1957 | Neilson | 296/157 |
| 2,822,213 | 2/1958 | Smith | 296/157 |
| 3,311,246 | 3/1967 | Jones, Sr. | 414/462 |
| 3,324,487 | 6/1967 | Hiett | 296/157 |
| 3,473,839 | 10/1969 | Elble | 296/157 |
| 3,508,787 | 4/1970 | Strong et al. | 296/157 |
| 3,539,219 | 11/1970 | Mueller | 296/157 |
| 4,036,520 | 7/1977 | Zuidema | 296/157 |
| 4,236,474 | 12/1980 | Buirski et al. | 296/157 |
| 4,261,613 | 4/1981 | Alford | 296/157 |
| 4,289,348 | 9/1981 | Greene | 296/157 |
| 4,294,484 | 10/1981 | Robertson | 296/176 |
| 4,333,191 | 6/1982 | Long | 114/344 |
| 4,416,485 | 11/1983 | Long | 296/157 |
| 4,420,181 | 12/1983 | Hallburg | 296/157 |
| 4,474,131 | 10/1984 | Buirski et al. | 296/157 |

Primary Examiner—Robert R. Song
Attorney, Agent, or Firm—Barnes & Thornburg

[57] ABSTRACT

A vehicle cap having unitary male mating structure for mounting and sealing with a female mating structure unitary to a boat. The male mounting structure includes two shoulders or recesses where the second shoulder seals and supports the female mating structure while the first shoulder recesses, but does not engage the wall of the boat to form an integral, aerodynamic structure. Rollers on the cap and struts joining the boat and cap guide the movement of the boat during both loading and unloading.

26 Claims, 3 Drawing Sheets

U.S. Patent  May 8, 1990  Sheet 1 of 3  4,923,242
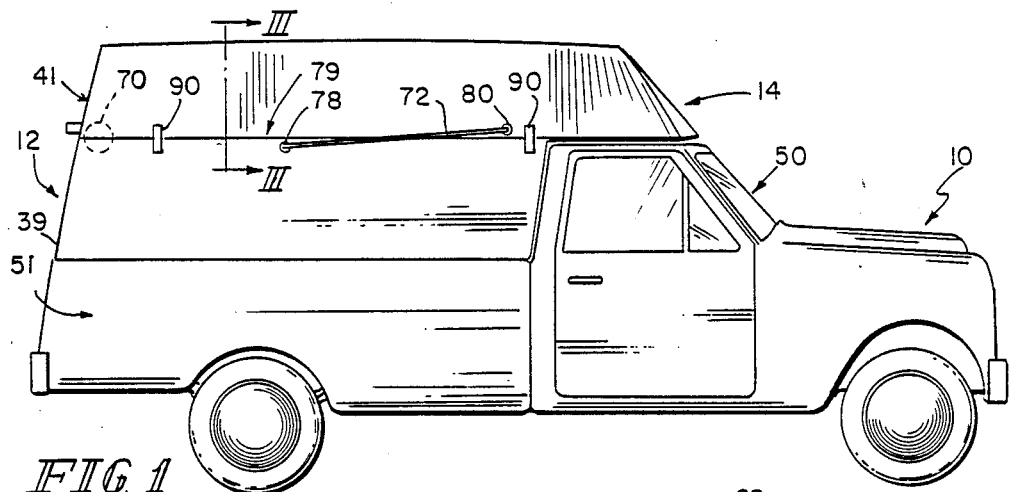
FIG. 1
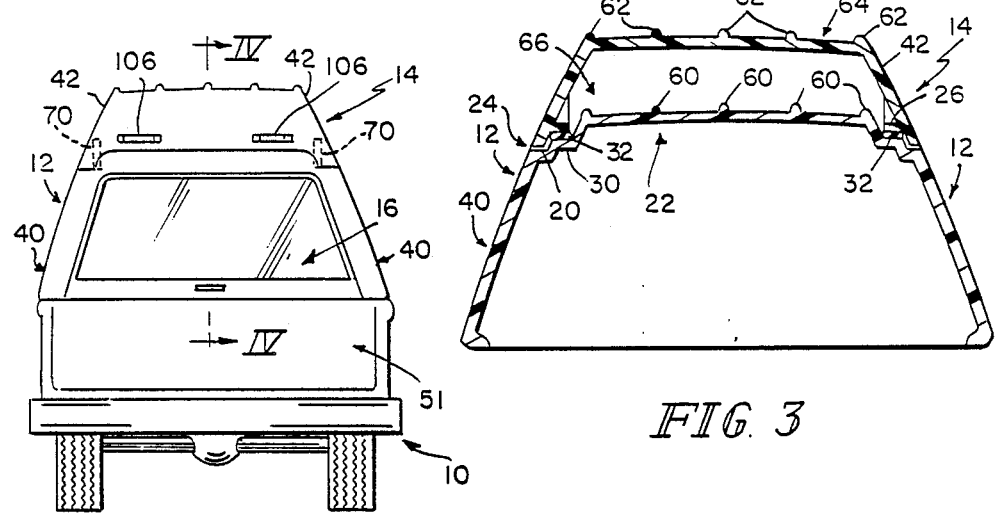
FIG. 2
FIG. 3
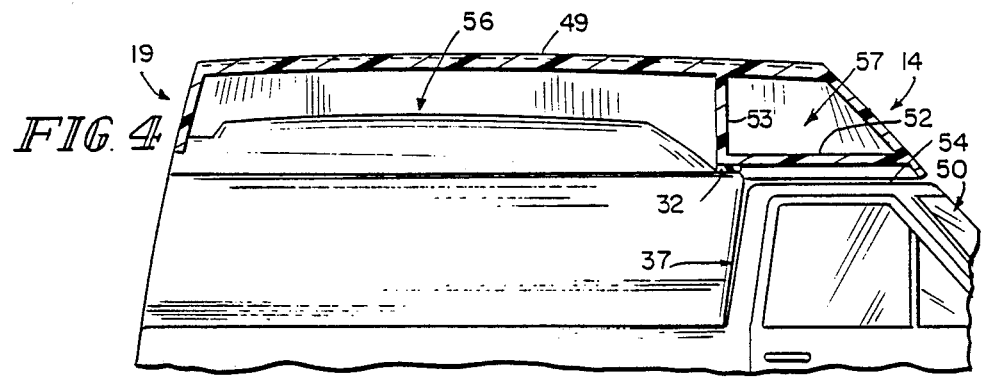
FIG. 4

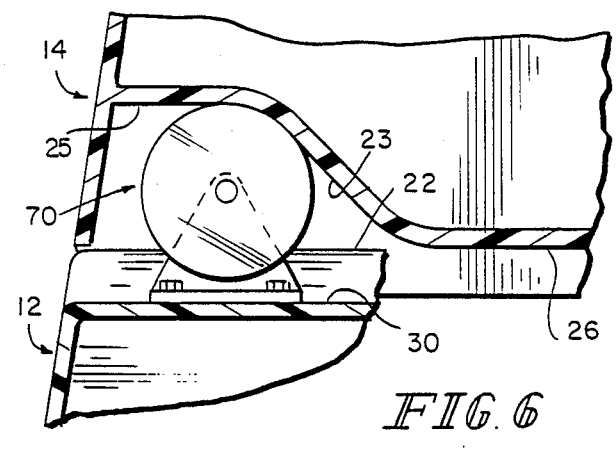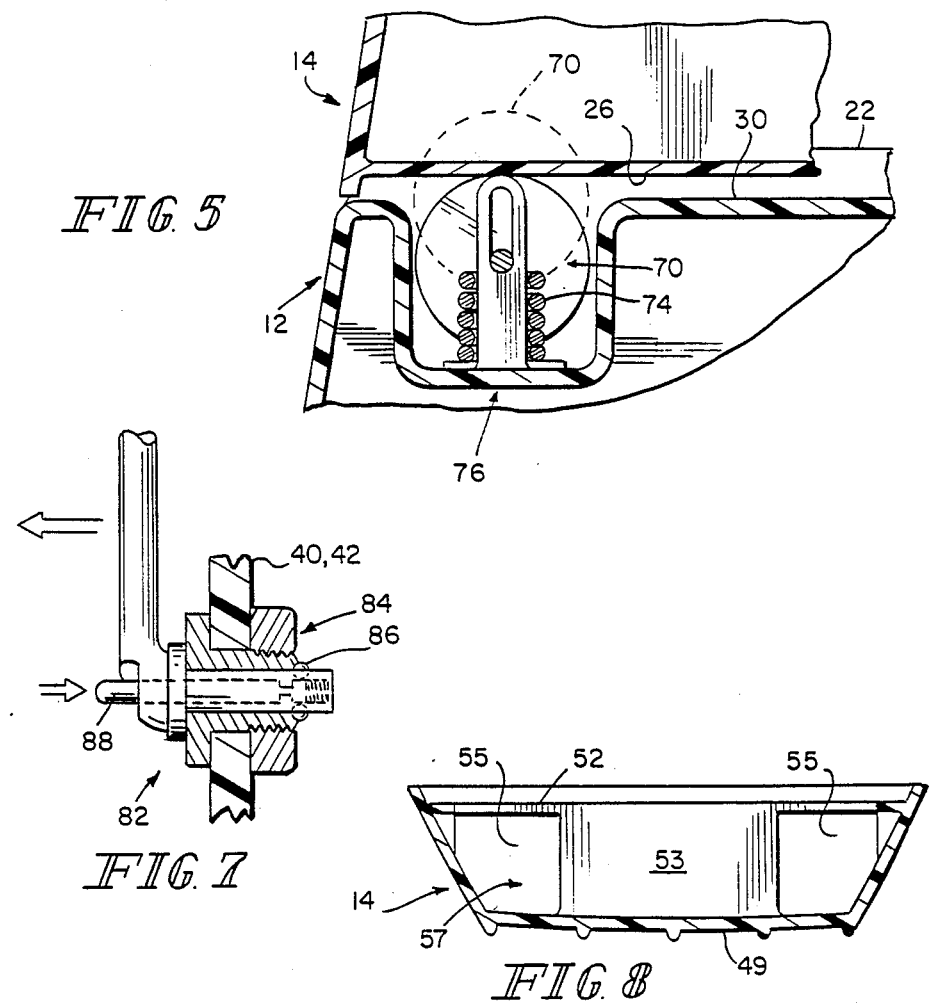

VEHICLE CAP AND BOAT COMBINATION

AND SUMMARY OF THE INVENTION

The present invention relates generally to boats and vehicles, and more specifically to a combined vehicle and boat which forms an integral aerodynamic structure.

The desirability of forming vehicle tops using boats is very old as shown by U.S. Pat. No. 1,455,994. In this patent, the top of the vehicle is open and covered by a boat which forms the roof. When the boat is removed the interior of the vehicle is exposed to the weather which is undesirable.

The ability to store a boat on the top of a travel trailer is also well known, as shown by U.S. Pat. Nos. 2,598,458 and 2,822,213.

Special racks to be mounted to the top of cars to mount a boat are shown in U.S. Pat. Nos. 2,817,852 and 3,539,219.

The mounting of a boat directly to the open bed of a pickup truck is shown by U.S. Pat. Nos. 3,508,787 and 4,420,181. The mounting of a boat to specially attached vertical walls of the bed of a pickup truck or a bed alone, is shown by U.S. Pat. Nos. 3,473,839; 4,416,485; 4,236,474; and 4,474,131. In all these patents, the boat forms the top of the closure of the pickup truck and there is no additional top. The first two patents show the boat having a portion which extends over the cab of the pickup truck.

A pop-up camper mounted to the open bed of the pickup truck is shown in U.S. Pat. No. 4,294,484.

Boats mounted to the top of vans or recreational vehicles are well known as shown by U.S. Pat. Nos. 3,324,487; 4,036 520; 4,261,613; and 4,289,348.

To aid in the removal of the boat from the top of a vehicle, rollers are provided on the boat as well as the top of the vehicle as shown in some of the previously discussed patents.

An object of the present invention is to provide a combination vehicle cap and boat combination which forms an integral, aerodynamic structure.

Another object of the present invention is to provide a vehicle and boat combination having complementary mating male and female structures.

A still further object of the present invention is to provide a combination vehicle cap and boat structure which seals the open cavity of the boat hull when mounted together.

A still even further object of the present invention is to provide an improved mechanism for removing the boat from the roof of a vehicle cap.

A still even further object of the present invention is to provide an improved restraint to prevent accidental dropping of the boat during removal from a vehicle cap.

These and other objects are attained by providing a vehicle cap and a boat with unique male mating structure unitary to the vehicle cap top wall and female mating structure unitary to and about the periphery of a deck aperture of the boat hull. The vehicle cap can be a separable cap mounted to the back of a bed of a truck or may be an integral part of a trailer or a vehicle. The sides and back walls of the cap and the boat form a smooth aerodynamic structure and are generally coplanar. The front and side edges of the deck aperture are sealed with the rear being open. The rear opening allows dirt and moisture to exit the rear and creates reduced pressure due to Venturi action.

The vehicle cap includes a pair of shoulders or recesses the first of which accommodates the top edge of the boat hull side and rear walls while the second shoulder mates with and seals to a support surface of the boat which is a lip displaced from the edge of the side of the boat hull. The boat support surface mounted on the second shoulder or recess maintains the top edge of the boat displaced from the first shoulder such that the support surface and the second shoulder form the seal and support structure. The deck at the front end of the boat extends over the cab of a pickup truck. A gasket is provided on the second shoulder recess along at least the front and side edges.

The boat and the cap top are molded fiberglass structure. This allows formation of the desired shoulders and recesses as well as a support surface. Other materials such as ABS plastic may be included in other embodiments.

To aid in the removal of the boat from the vehicle the vehicle cap includes rollers at the rear top edge of the cap. The support surface of the boat in combination with the side walls provide a race for the rollers. A pair of struts are pivotally connected to the boat and cap side walls for limiting the path of travel of the boat relative to the cap. The struts are detachably mounted to the cap and the boat. The struts limit the path of travel of the boat relative to the cap such that the boat will maintain engagement with the rollers at least until the boat contacts the ground.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a pickup truck with a cap and boat according to the present invention.

FIG. 2 is a rear view of a cap and top on a pickup bed according to the present invention.

FIG. 3 is a cross-sectional view taken along lines III—III of FIG. 1.

FIG. 4 is a cross-sectional view taken along view IV—IV of FIG. 2.

FIG. 5 is an enlarged cross-sectional view of a first embodiment of a roller according to the principles of the present invention.

FIG. 6 is an enlarged cross-sectional view of a second embodiment of a roller according to the principles of the present invention.

FIG. 7 is an enlarged cross-sectional view of a removable retainer pin according to the principles of the present invention.

FIG. 8 is a vertical section through the boat illustrating the front compartment.

DESCRIPTION OF THE PREFERRED EMBODIMENT

Figure 9:
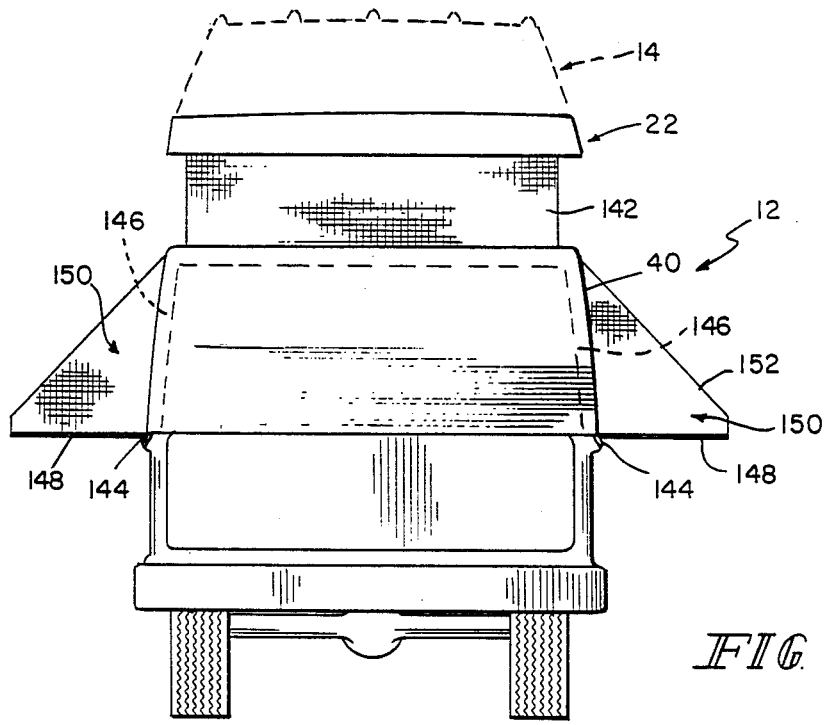
FIG. 9 is a rear view of a pop-up embodiment of the cap of the present invention.

Referring to FIGS. 1 and 2, a conventional pickup truck 10 is illustrated, equipped with the vehicle cap shell 12 and boat 14 combination. One or more windows 16 may be provided in the vehicle cap shell 12 as desired.

The vehicle cap shell 12 may be readily installed on a conventional pickup truck 10 either professionally or by a "do-it-yourselfer" with some knowledge of tools. In the preferred embodiment, the vehicle cap shell 12 is molded in one piece out of fiberglass and the boat 14 is molded in two pieces out of fiberglass and the fiberglass sections are joined together.

Referring to FIGS. 3 and 4, the mating surfaces of the vehicle cap shell 12 and the boat 14 are molded having a complementary male and female configuration to provide a sealed, aerodynamic integral structure. A first shoulder or peripheral recess 20 is molded into the external surface of shell top 22. This first shoulder 20 provides relief so that the rim or top edge of the wall 24 of the boat 14 has clearance when installed on the shell top 22. The first shoulder 20 should extend around the two side and back walls of the shell top 22. The vertical height of the shoulder 20 is selected to be greater than the vertical distance between the rim 24 and a mounting surface or lip 26 of the boat 14 so that the rim 24 does not rest on the horizontal portion of shoulder 20. In the preferred embodiment, the first shoulder 20 extends approximately 1 inch horizontally and approximately $1\frac{1}{2}$ inches vertically on the side surfaces of the shell top 22. The side wall thickness of the boat 14 is generally $\frac{1}{8}$ to $\frac{1}{4}$ inches.

A second shoulder or recess 30 is molded into the external surface of shell top 22. This second shoulder 30 has a sealing gasket 32 on its horizontal surface and serves as a bearing and sealing surface with the interior mounting surface 26 of the boat 14. The sealing gasket 32 may be a separate removable element or permanently attached to the boat 14 or shell 12. Shoulder 30 is the sole load bearing and sealing portion of the shell top 22. The extra clearance between the first shoulder 20 and the rim 24 of the boat 14 allows for manufacturing tolerance of the boat 14 and vehicle shell 12 as well as changes in the thickness of gasket 32 due to aging, environment, wear and tear. In the preferred embodiment, the mounting surface 26 extends around the side and front walls of the boat and not the back wall. Thus, the second shoulder 30 need only extend about the periphery of the front and two side edges of the top 22 of the shell 12.

In the preferred embodiment, the second shoulder 30 extends approximately $3\frac{1}{2}$ inches horizontally and approximately 4 inches vertically. The sealing gasket 32 is generally between $\frac{1}{8}$ and $\frac{1}{2}$ inch thick and 2 inches wide. The distance between the horizontal surface of the first shoulder 20 of the vehicle shell 12 and the rim 24 of the boat 14 is approximately $\frac{1}{2}$ inch when the boat 14 is mounted on the vehicle shell 12.

The angle of the external side walls 42 of the inverted boat 14 are substantially the same as the angle of the external side walls 40 of the vehicle shell 12. When the boat 14 is inverted and installed onto the shell top 22, the rear wall 39 and side walls 40 of the vehicle shell 12 are substantially coplanar with the rear wall 41 and side walls 42 of the inverted boat 14 resulting in a smooth aerodynamic profile. The rear and side walls of the vehicle shell 12 are also designed to provide a substantially coplanar smooth aerodynamic profile with the cab 50 and bed 51 of the truck 10.

The forward portion of the boat 14 forward of the sealing gasket 32 and extending over the pickup cab 50 includes a molded deck 52 which is substantially parallel to the top surface 54 of the pickup truck cab 50. The deck surface 52 is displaced from the top edge of the side walls 42 of the boat the same distance as the mounting surface 26 and forms part of the mounting surface at the front wall 37 of the shell top. The deck 52 defines a deck aperture or cavity 56 which is sealed. A support panel 53 located between the molded deck 52 and the boat hull 49 supports the molded deck 52 and has two access openings 55 (FIG. 8) which allow items such as life preservers, fishing poles, equipment and other items to be stored in the cavity 57 between the molded deck 52 and the boat hull 49.

The existence of the deck surface 52 on the boat along with the rubber gasket 32 prevents air, water and debris from entering into the cavity 56 of the boat 14 along the front and side walls when mounted on the vehicle shell 12 and traveling on the highway. This arrangement minimizes the air flow force tending to lift the front portion of the boat 14 up and away from the pickup cab top 54 and allows the use of a much simpler and inexpensive clamping arrangement between the boat 14 and the vehicle shell 12 during transport.

The sealing gasket 32 is present only in the front and two sides of the vehicle shell 12. Although the rear of the vehicle shell 12 could be sealed, in the preferred embodiment, the rear of the vehicle shell 12 is left unsealed in order to allow dirt and moisture to escape from the boat cavity 56, as well as to cause a reduction in pressure in the boat cavity 56 from a Venturi effect tending to force the boat 14 down on the sealing gasket 32 while traveling.

The height of the external side walls 42 of the boat 14 are approximately 18 inches. The rear wall 41 of the boat 14 has a cut-out portion of approximately 3 inches below the external side walls 42 of the boat 14 to accommodate a boat motor (not shown). The molded thickness of the external side walls 42 of the boat 14 is approximately $\frac{1}{8}$ to $\frac{3}{4}$ inches while the rear wall 41 of the boat 14 is reinforced with plywood and is approximately $1\frac{1}{2}$ inches thick in order to accommodate the additional structural stresses resulting from the boat motor.

Bench seats may be provided and molded across the cavity 56. Alternatively, mounting brackets may be provided on the floor of the hull or in the molded bench seats to receive pedestal captain chairs.

The shell top 22 includes five reinforcing ridges 60 which are molded into the vehicle shell 14 and provide strength and rigidity to the shell top 22. Five substantially similar reinforcing ridges 62 are molded into the external bottom surface 64 of the boat 14. The reinforcing ridges 62 provide strength and rigidity to the bottom surface 64 of the hull of the boat 14 as well as assist in stabilizing the travel of the boat 14 through the water. The outer edge of the outer reinforcing strips 66 of the boat 14 is an extension of the external side walls 42 of the boat 14. This provides optimum steering control for the boat 14 through the water. As an alternative, internal reinforcing strips may be provided and the external strips 62 would provide aerodynamic and steering stability. In a preferred embodiment, the five reinforcing ridges 60, 62 are equally spaced across the width of the shell top 22 and boat bottom 64 and have a height descending from the center ridge of approximately $1\frac{1}{4}$ inch to a height of approximately $\frac{3}{4}$ inch for the outer ridges.

In a preferred embodiment shown in FIG. 6, the wheel roller 70 is fixed and extends above the second shoulder 30. The mounting surface 26 is modified to include a recessed portion 25 connected to surface 26 by inclined surface 23 to form a recess to initially restrict relative movement between the boat 14 and shell 12. When the boat 12 is pulled backward, the roller 70 on inclined surface 23 causes the boat to rise.

Referring to FIGS. 1 and 5, two roller wheels 70 and two detachable pivot arms or struts 72 facilitate the removal of the boat 14 from the vehicle shell 12. The two roller wheels 70 are recessed in and below the horizontal surface of the second shoulder 30 at the rear end of the shell top 22. A compressible spring 74 is attached below the roller wheel 70 and is compressed when the boat 14 is secured or latched on the shell top 22. The springs 74 are strong enough to rise and lift the rear of the boat 14 when the boat is unlatched. The interior mounting surface 26 of the boat 14 rests on the roller wheel 70. The mounting surface 26 and adjacent portion of the sidewalls 42 of the boat form a race for the roller wheels 70. In the preferred embodiment, the roller wheels 70 are approximately 3 inches in diameter and approximately 1½ inch wide. When compressed into the recess 76, the roller wheels 70 extend approximately ⅛ inch above the horizontal surface of the second shoulder 30, which corresponds to the thickness of the sealing gasket 32.

Two detachable pivot arms or struts 72 can be installed onto each side of the vehicle shell 12 at pivot point 78 and onto each side of the boat 14 at pivot point 80. Using a snap pin 82, for example, as illustrated in FIG. 7, the grommet 84 is permanently installed into the external side walls 40 of the vehicle shell 12 at pivot point 78, and into the external side walls 42 of the boat 14 at pivot point 80. Snap pin 82 is rather conventional in structure and includes ball snaps 86 which are retracted by depression of a push button 88. In a preferred embodiment for a standard 8 foot pickup truck bed, the pivot strut is approximately 4 feet in length and pivot point 78 is located 3 to 4 inches aft of the centerline of the vehicle shell 12 and approximately 4 inches below external interface 79 of the vehicle shell 12 and the boat 14. Pivot point 80 is located approximately 3 inches above the external interface 79 of the vehicle shell 12 and the boat 14.

The boat 14 is secured to the vehicle shell 12 during transportation by four latches 90, such as conventional cam locks. A key lock may be included in one or more of these latches 90, if desired, for security. To secure the boat 14 onto the vehicle shell 12, the interior mounting surface 26 of the boat 14 is placed onto the sealing gasket 32, and each of the latches 90 are engaged to provide a tight seal between the boat 14 and the sealing gasket 32.

To unload the boat 14 from the vehicle shell 12 the four latches 90 are disengaged, and the pivot struts 72 are attached. The front end of the boat 14 is then lifted vertically above the pickup truck cap 50, while the rear end of the boat 14 is pulled rearward using one or more handles 106 exterior, added to, or imbedded into the boat 14. In the preferred embodiment, two conventional handles 106 are permanently attached at the rear wall 41 of the boat 14. The boat's travel is guided by the roller wheels 70 and the pivot struts 72 which maintain the support surface 26 on the rollers 70 during both loading and unloading and limit its travel. At such point that the rear end 41 is resting on the ground, the detachable pivot struts 72 are removed by disengaging the snap pins 82. The boat 14 is then manually turned over and carried to the water.

One or more handles may be added to, or imbedded into the molded deck 52. Alternatively, the initial vertical lifting of the front end of the boat 14 may be accomplished through the use of spring cylinders which are connected between the external side walls 40 of the vehicle shell 12 and the exterior side walls 42 of the boat 14 just behind the pickup cap 50.

Referring to FIG. 9, in another preferred embodiment of the vehicle shell 12, once the boat 14 is removed from the vehicle shell 12, the shell top 22 is raised vertically approximately 20 inches to allow a person to stand upright inside the vehicle shell 12. Flexible fabric 142, such as canvas, encloses the raised shell top 22 around all four sides. The external side walls 40 of the vehicle shell 12 folded downward from a series of hinges 144, and are supported horizontally by aluminum tubes 146 to form sleeping platforms 148 on each side of the vehicle shell 12. Flexible fabric, such as canvas, encloses the end portions 150 and the angled portion 152 of the enclosed sleeping platforms 148.

Figure 10:
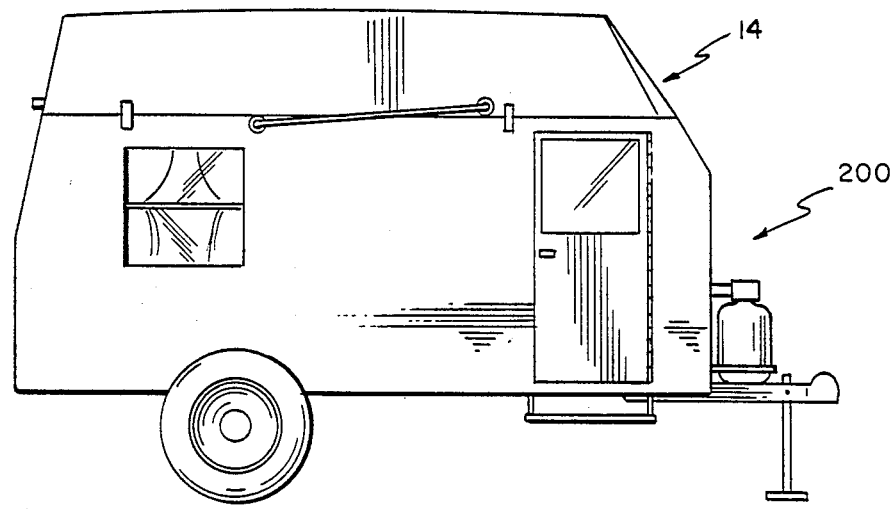
FIG. 10 is a side view of a recreational vehicle or travel trailer incorporating the principles of the present invention.

Although the present invention has been described thus far for a combination with a shell to be provided on the open bed of a pickup truck, the principles of the present invention are also applicable to other types of vehicles. As illustrated in FIG. 10, the boat 14 is shown mounted to a recreational vehicle 200. The top of the recreational vehicle includes the appropriate first and second shoulders, not shown, to receive the support surface of the boat as well as to provide a uniform unitary aerodynamic structure. The portion of the recreational vehicle 200 below deck 52 is flat and does not include any of the shoulders. It should also be noted that the recreational vehicle 200 would also have the same shape of a travel trailer which could be attached to and pulled by other vehicles equivalent to an Airstream camper trailer.

From the preceding description of the preferred embodiments, it is evident that the objects of the invention are attained, and although the invention has been described and illustrated in detail, it is to be clearly understood that the same is by way of illustration and example only and is not to be taken by way of limitation. The spirit and scope of the invention are to be limited only by the terms of the amended claims.

What is claimed:

1. A vehicle cap and boat combination comprising:
    a vehicle cap for attaching to a bed of a truck having a cab;
    said vehicle cap having a top, front, back and two side walls;
    a boat having a hull including a bottom, front, back and two side walls and a deck extending over a portion of the interior of said hull to define a deck aperture;
    male mounting means unitary to and about the periphery of said top wall of said vehicle cap;
    female mating means unitary to and about the periphery of said deck aperture for mating with said male mating means and sealing said deck aperture at least along said front and said two side walls when said boat is mounted on said vehicle cap; and
    said deck aperture of said boat extends over said cab when mounted.

2. A vehicle cap and boat combination according to claim 1, wherein said cap and boat are molded fiberglass.

3. A vehicle cap and boat combination according to claim 1, wherein said boat has the same width and length as the combined cap and cab.

4. A vehicle cap and boat combination according to claim 1, wherein said cap is a unitary part of a vehicle and said male mating means is displaced from said front of said boat by a distance equivalent to a length of said deck, and said cap and boat have the same width.

5. A vehicle cap and boat combination according to claim 1, wherein said back and two side walls of said cap and boat are configured to be coplanar respectively when mounted to each other.

6. A vehicle cap and boat combination according to claim 1 wherein:
said female mating means includes a lip about the periphery of said deck aperture having a width extending from at least said side walls of said hull and displaced from a top edge of said walls by a first distance;
said male mating means includes a first shoulder having a horizontal portion extending from at least said cap's side walls toward the interior and a second shoulder having a vertical portion extending upwardly from said first shoulder's horizontal portion and a horizontal portion extending inwardly from said second shoulder's vertical portion;
said lip of said boat engaging said second shoulder's horizontal portion when said boat and cap are mounted to each other.

7. A vehicle cap and boat combination according to claim 6, wherein said second shoulder's vertical portion has a height equal to or greater than said first distance to maintain said top edge of said boat walls displaced from said first shoulder's horizontal portion.

8. A vehicle cap and boat combination according to claim 7, wherein said second shoulder includes a gasket on its horizontal portion.

9. A vehicle cap and boat combination according to claim 6, wherein said second shoulder's horizontal portion has a width equal to or greater than said width of said lip.

10. A vehicle cap and boat combination according to claim 6, wherein said first shoulder extends around said cap's back and two side walls and said second shoulder extends around said cap's front wall and adjacent said cap's back and two side walls.

11. A vehicle cap and boat combination according to claim 10, wherein said deck is displaced from said top edge of said side wall by said first distance to form a portion of said lip at a front edge of said deck aperture.

12. A vehicle cap and boat combination according to claim 6, wherein said hull's back wall includes a recess extending from said top edge a second distance greater than said first distance so as not to seal with said cap at said recess when said boat and cap are mounted to each other.

13. A vehicle cap and boat combination according to claim 6, wherein said cap is a unitary part of a vehicle and said male mating means is displaced from said front of said boat by a distance equivalent to a length of said deck, and said cap and boat have the same width.

14. A vehicle cap and boat combination according to claim 1, wherein said male mating means includes a gasket.

15. A vehicle cap and boat combination according to claim 6, wherein said deck is displaced from said top edge of said side wall by said first distance to form a portion of said lip at a front edge of said deck aperture.

16. A cap and boat for a vehicle having a cab and open bed comprising:
a cap having top, front, back and two side walls to be mounted on and covering a bed of a vehicle;
a boat having a hull including a bottom, front, back and two side walls;
mounting means for mounting said at least two side walls of said hull to said cap;
said cap being configured to form an aerodynamic extension of a cab of said vehicle and said bed of said vehicle; and
said hull extending from said cap over said cab and being configured to form aerodynamic extensions of said cap and cab.

17. A cap and boat combination according to claim 16, wherein said back and side walls of said cap are coplanar with side and back walls of said bed, said side walls of said cap are coplanar with side walls of said cab; said back and side walls of said hull are coplanar with back and side walls of said cap, and said side and front walls of said hull are coplanar with side and front walls of said cab.

18. A cap and boat combination according to claim 16, wherein said cap's top wall includes a first peripheral recess at said side and back walls of said cap to receive said side and back walls of said hull.

19. A cap and boat combination according to claim 18, wherein:
said hull includes a sealing lip extending from the interior of said front and side walls of said hull and displaced from a top edge of said front and side walls; and
said cap's top wall includes a second peripheral recess adjacent said front and side walls of said cap to receive and engage said sealing lip of said hull.

20. A cap and boat combination according to claim 19, wherein said second recess includes a gasket.

21. A cap and boat combination according to claim 19, wherein said lip is recessed sufficiently from said top edge so that said top edge is spaced from said first recess when said lip engages said second recess.

22. A cap and boat combination according to claim 16, wherein said cap and boat are molded fiberglass.

23. A cap and boat combination according to claim 16, wherein said boat includes a deck extending from the interior of said front wall and portions of said side wall of said hull which extend past said cap.

24. A vehicle cap and boat combination comprising:
a vehicle cap having top, front, back and side walls;
rollers at top rear edges of said cap;
a boat having a race along side walls of said boat for receiving said rollers when said boat is on said cap; and
a pair of strut means each pivotally connected between corresponding side walls of said cap and boat for limiting the path of travel of said boat relative to said cap.

25. A vehicle cap and boat combination according to claim 24, wherein said strut means are detachably mounted to said cap and boat.

26. A vehicle cap and boat combination according to claim 24, wherein said strut means limits the path of travel of said boat relative to said cap such that said boat will maintain engagement with said rollers at least until said boat contacts ground.

\* \* \* \* \*

UNITED STATES PATENT AND TRADEMARK OFFICE
CERTIFICATE OF CORRECTION

PATENT NO. : 4,923,242

DATED : May 8, 1990

INVENTOR(S) : Michael D. Gentzhorn

It is certified that error appears in the above-identified patent and that said Letters Patent is hereby corrected as shown below:

In column 3, at line 28, please delete "$\frac{1}{4}$" and insert therefor --$\frac{3}{4}$--.

Signed and Sealed this

Seventh Day of May, 1991

Attest:

HARRY F. MANBECK, JR.

Attesting Officer

Commissioner of Patents and Trademarks